Sept. 27, 1932.  A. OBERHOFFKEN  1,879,436
MACHINE TOOL
Filed Nov. 5, 1930  3 Sheets-Sheet 1

INVENTOR.
A. OBERHOFFKEN
BY
ATTORNEY.

Sept. 27, 1932.   A. OBERHOFFKEN   1,879,436
MACHINE TOOL
Filed Nov. 5, 1930   3 Sheets-Sheet 2

INVENTOR
A. OBERHOFFKEN
BY
ATTORNEY

Sept. 27, 1932.   A. OBERHOFFKEN   1,879,436
MACHINE TOOL
Filed Nov. 5, 1930   3 Sheets-Sheet 3

INVENTOR.
A. OBERHOFFKEN
BY
ATTORNEY

Patented Sept. 27, 1932

1,879,436

UNITED STATES PATENT OFFICE

ALEXANDER OBERHOFFKEN, OF ROCKFORD, ILLINOIS, ASSIGNOR TO THE INGERSOLL MILLING MACHINE COMPANY, OF ROCKFORD, ILLINOIS, A CORPORATION OF ILLINOIS

MACHINE TOOL

Application filed November 5, 1930. Serial No. 493,545.

The present invention relates in general to machine tools and since it is more particularly concerned with a so-called profiling machine this application has been selected for illustrating its salient features.

The invention is exemplified in the combination and arrangement of parts shown on the accompanying drawings and described in the following specification and it is more particularly pointed out in the appended claims.

Figure 1:
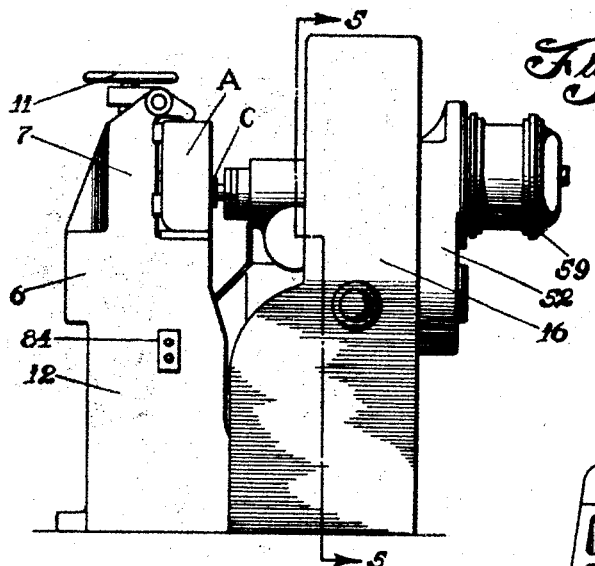
Fig. 1 is a view in side elevation of a cylinder head profiling machine illustrating one application of the invention.
Figure 2:
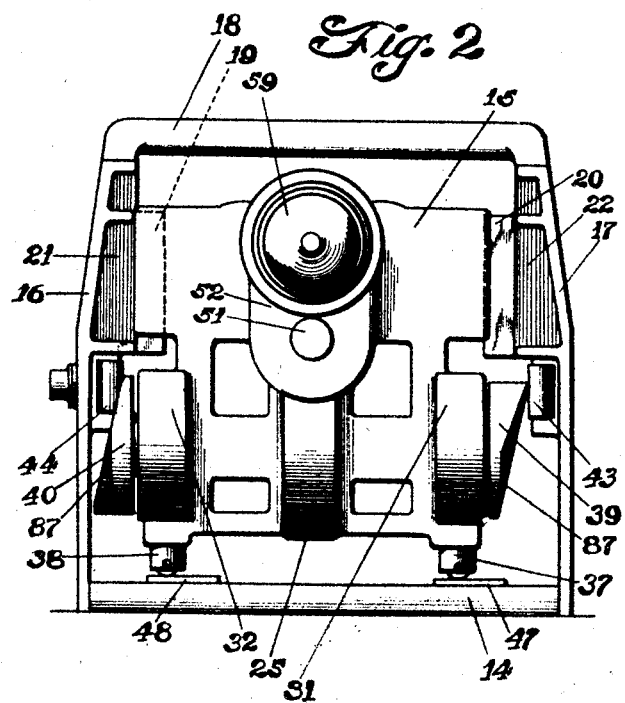
Fig. 2 is a view in rear elevation of the machine shown in Fig. 1 showing the tool support in one operating position.

The embodiment selected for illustrating the invention is a milling machine for profiling the compression recesses in cylinder heads of internal combustion engines. To successfully measure up to production requirements, a machine of this type must be not only accurate in its performance but it must complete its cycle of operation as quickly as possible and must not burden the operator with too many manual operations. Its operating cycle should therefore be at least semi-automatic. A machine constructed in accordance with the present invention embraces all of these advantages and requirements and the preferred form of such a machine comprises the following organization of parts:

A represents the work piece which in the present instance is a cylinder head for internal combustion engines the same being provided with compression recesses B which are to be profiled preferably two at a time by a pair of cutting tools C.

To initiate an operating cycle the tools are moved toward the work so that the cutters will enter the recesses B. At the start, the cutters are positioned about the center of the recesses and while continuously rotating are moved out from the center to the left hand marginal contour of the recesses (viewed from Fig. 4) from where they follow around the marginal edge of the recesses from left to right (viewed from Fig. 4) returning to the center over the same path which they cover in moving from the center to the margin in the first place. This movement on the part of the cutters profiles the marginal contour of the recesses and with the end of the cutters finishing the surface bounded by the marginal contour.

In developing this path of movement for the machining operation the work support is stationary, at least during the operating cycle, and the tool is caused to describe an irregular orbit at an angle to its axis of rotation. This is one of the important features of applicant's invention which distinguishes it over other machines that have heretofore been proposed for accomplishing profiling operations of a similar nature.

The work A is supported on a bed-plate 5 of the fixture 6 on its side so as to present the compression recesses B in confronting relation with the cutters C and perpendicular to the cutter's axis.

The work is backed up by an up-standing abutment 7 on the fixture with pads 8 against which the work rests. The work is clamped in this position by clamping members 9 mounted for pivotal movement on a cross rod 10 so that they can respond to the hand wheel 11 for clamping and unclamping the work. The fixture as a whole is supported upon a pedestal-like column 12 and this column is made with a chute 13 for handling chips. The lower end of the column terminates in a base extension 14.

The tool support 15 is mounted for both vertical and horizontal movement between side columns 16 and 17 which are joined at their top by a horizontal bridge member 18. The lower ends of these side columns are joined to the base extension 14.

Figure 5:
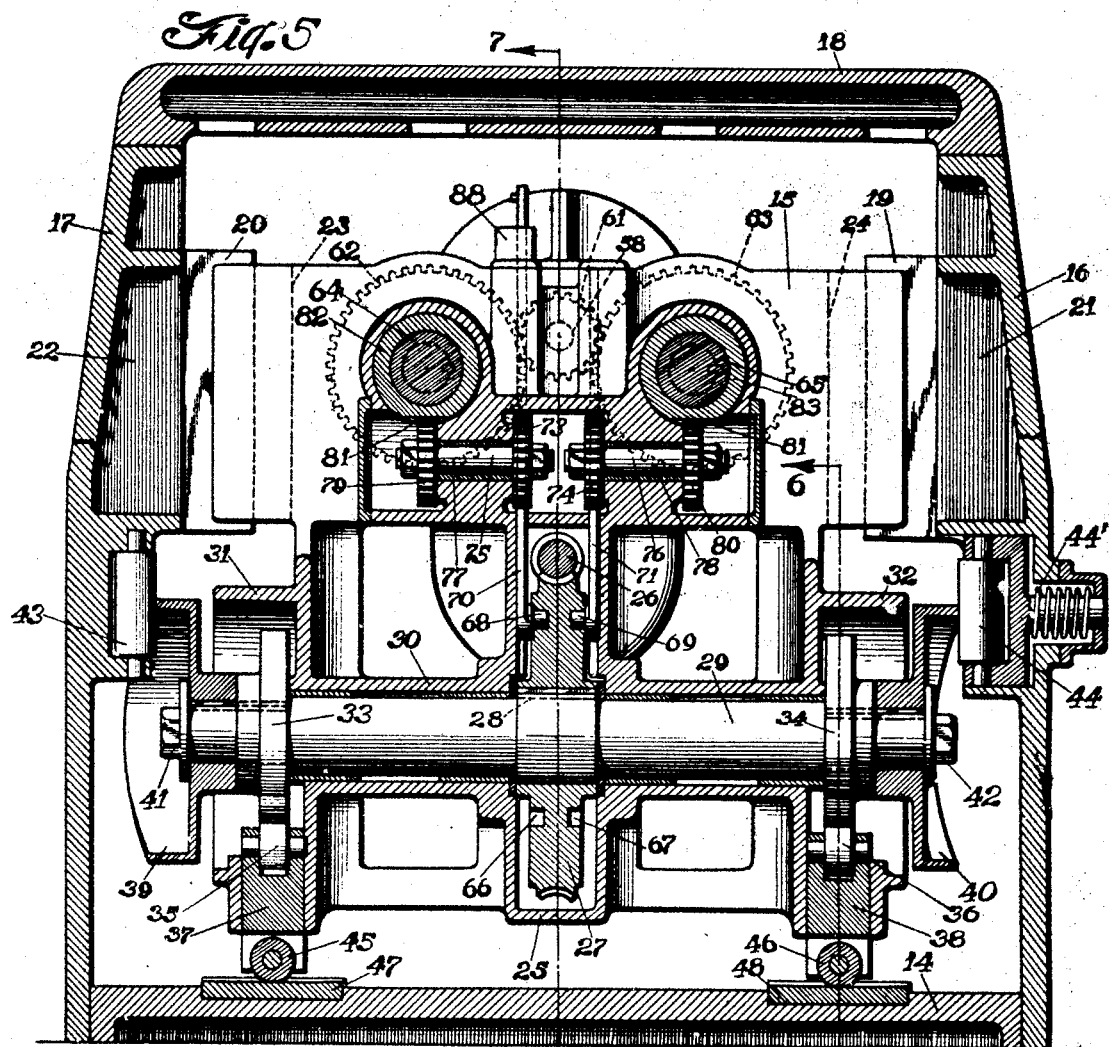
Fig. 5 is a view in section, taken on the line 5—5, Fig. 1.

The tool support 15 is guided in its vertical and horizontal movements between the columns 16 and 17 by vertical slides or ways 19 and 20 which are cast as a part of the columns 16 and 17 and spaced therefrom by web portions 21 and 22. As shown best in Fig. 5 the tool support 15 is made with bi-furcations 23 and 24 which embrace the ways 19 and 20 with a snug fit yet with freedom of sliding movement in both vertical and horizontal directions of movement. The tool support is formed as a heavy plate and the lower portion thereof is cast with a housing 25 for the worm 26 and the worm gear 27. This worm gear 27 is keyed as at 28 on a horizontal cam shaft 29 journaled in the shaft housing 30 also cast as a part of the work support. Opposite sides of this shaft housing 30 are made with guards 31 and 32 to enclose the cams 33 and 34 which are keyed on the shaft 29 adjacent opposite ends thereof. The roller followers 35 and 36 and their supports 37 and 38 are also confined respectively in the bottoms of the guards 31 and 32.

Cams 39 and 40 and the cams 33 and 34 are keyed on the shaft 29 to rotate therewith and nuts 41 and 42 are threaded on the ends of the shaft to hold the cams thereon. It is to be noted that the end cams 39 and 40 are inverted in respect to one another so that the narrowest part of one is wiping across the roller 43 while the widest part of the other is wiping across the roller 44. These rollers 43 and 44 are mounted with freedom of rotation in suitable bearings cast on the inside of the columns 16 and 17. The bearing mounting for the roller 44 is floated and backed up by a spring 44' to account for any possible inaccurate construction. The supports 37 and 38 for the followers 35 and 36 are also equipped with rollers 45 and 46 which roll on track plates 47 and 48. These rollers 45 and 46 carry the tool support with freedom of horizontal movement as a result of such motion being imparted to it by the side cams 39 and 40.

The worm 26 is mounted on a shaft 49 which is journaled as at 50 at one end in a bushed bearing made to receive it in the housing 25 with its opposite end mounted in the ball bearing assembly 51 in the back wall 52 of the tool support. The shaft 49 is equipped with a spur gear 53 which meshes with a spur gear 54 on a counter shaft 55. The counter shaft 55 is mounted at its opposite ends in ball bearings and carries a spur gear 56 which meshes with the gear 57 on the shaft extension 58 of the motor 59. The shaft extension 58 is mounted in a ball bearing assembly 60 at its forward end and carries a gear 61 which is in constant mesh with gears 62 and 63 for driving the spindles 64 and 65 of the cutters C.

It will be thus seen how the worm and worm gear is driven from the motor 59 through the counter-shaft transmission for imparting rotation to the shaft 29. The motor also serves to drive the spindles 64 and 65 of the cutters C in the manner stated.

With the motor 59 running continuous rotation is imparted to the cutters C and the shaft 29. As a result of this continuous rotation of the cutters c and the shaft 29, the machine completes its cycle of operation, of course, after the cutters have been moved into the work.

To realize a relative initial movement between the work and cutters so as to feed the cutters to depth I prefer to impart axial movement to the cutters. This movement is accomplished by camming grooves 66 and 67 formed in opposite sides of the worm wheel 27. These grooves are made to accommodate rollers 68 and 69 carried on the end extremities of rods 70 and 71. These rods are formed intermediate their ends with rack teeth 72 which mesh with pinions 73 and 74 on the ends of stub shafts 75 and 76. The shafts are journaled in bearings 77 and 78. On the opposite ends of the shafts are pinions 79 and 80 which are in constant mesh with rack teeth 81 on the quills 82 and 83 for the spindles 64 and 65.

The camming grooves 66 and 67 have a constant radius which the rollers 68 and 69 follow throughout the profiling cycle and a variable radius which the rollers follow for feeding the cutters into depth and retracting them again.

*Operation*

Figure 7:
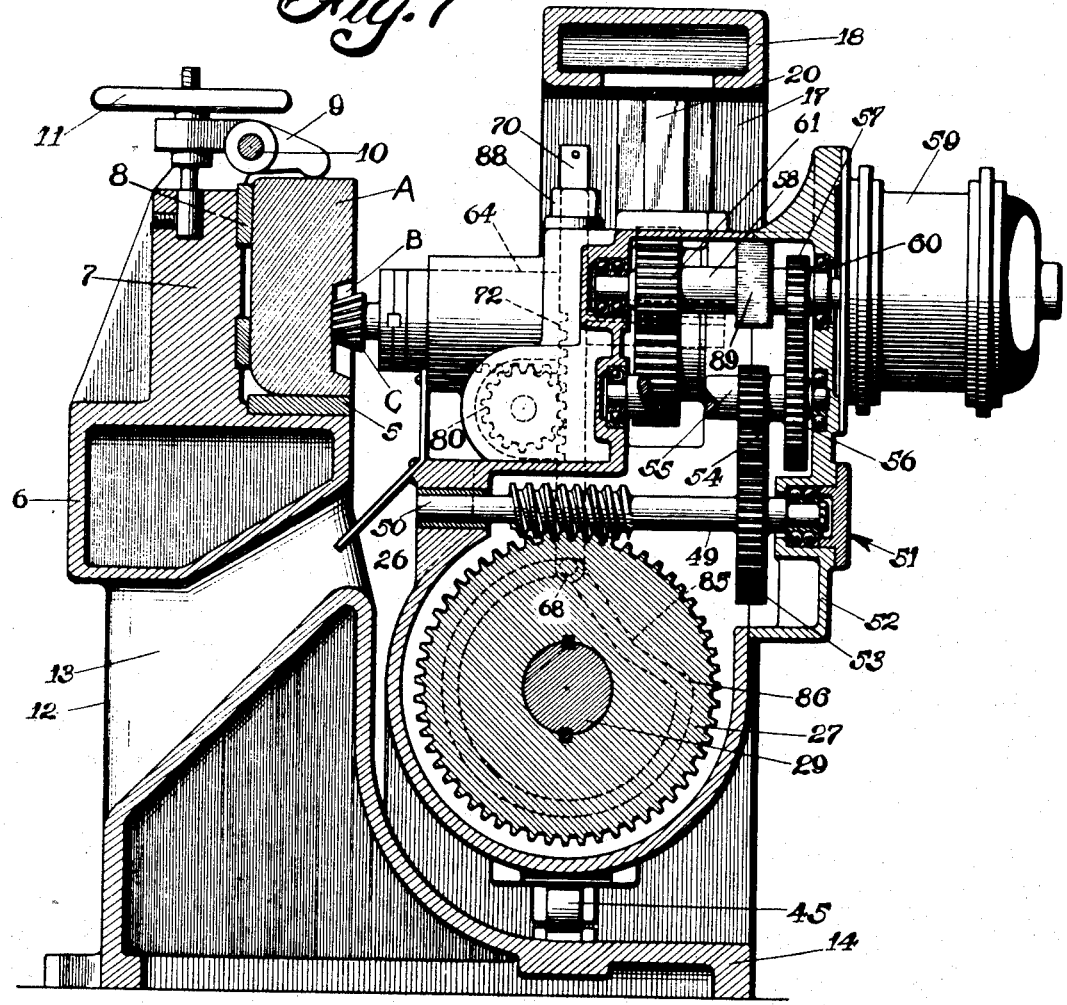
Fig. 7 is a detail view in section, taken on the line 7—7, Fig. 5.

The work A is set up as indicated in Figs. 1 and 7 and the switch 84 for starting the motor 59 is manipulated by the operator. In Fig. 7 the position of the rollers 68 and 69 and the position of the cutters C indicate that the profiling cycle of the machine has been completed but the cutters have not been retracted. When the cutters have been retracted the rollers 68 and 69 will occupy a low position as at 85 in the variable radius of the camming grooves so that when the motor 59 is started to initiate an operating cycle the drive for the worm wheel 27 will rotate the same anti-clockwise, viewed from Fig. 7, which will cause the rollers 68 and 69 to move from the low point 85 in the variable radius of the camming grooves to the high point 86 which is the commencement of the constant radius of the grooves. The movement of the rollers from the low point 85 to the high point 86 will raise the rods 70 and 71 imparting rotation to the pinions 75 and 76 which are keyed to the stub shaft and since the pinions 77 and 78 are also keyed to the same shafts axial sliding movement will be imparted to the cutter spindles projecting them into the work. As the cutters are rotating during their axial movement into the work they will cut into depth. Just as soon as the rollers reach the high point 86 in the camming grooves the projecting movement of the cutters ceases and at this time they will have cut into depth. The rollers in following the constant radius of the camming grooves do not impart any axial movement to the spindles, consequently throughout the profiling cycle the depth of the cut is uniform. In the event it should become necessary to vary the depth of the cut during the profiling cycle the constant radius of the grooves could be changed to impart the necessary axial movement to the cutters at predetermined stages in the profiling cycle. At the completion of the profiling cycle the rollers will occupy a position in the camming grooves as indicated in Fig. 7 and when they move from this high point to the low point 85 they will pull the rods downwardly and thus retract the cutters from the work.

Figure 4:
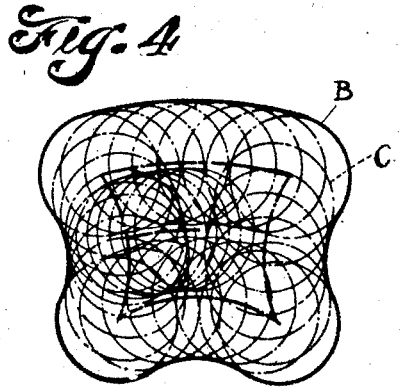
Fig. 4 is a view showing the path of movement of the tools.
Figure 3:
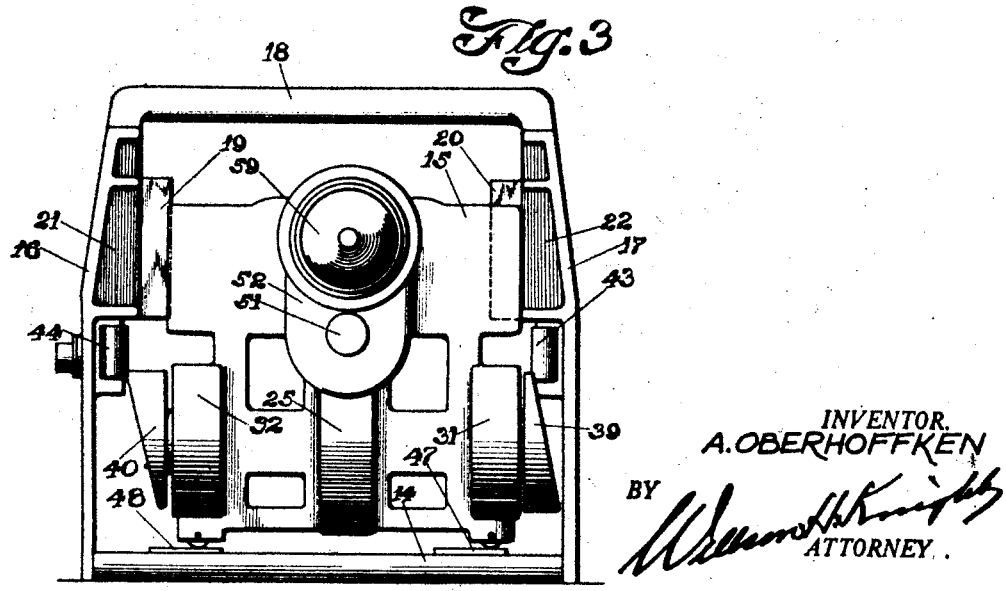
Fig. 3 is a similar view showing the tool support in another operating position.
Figure 6:
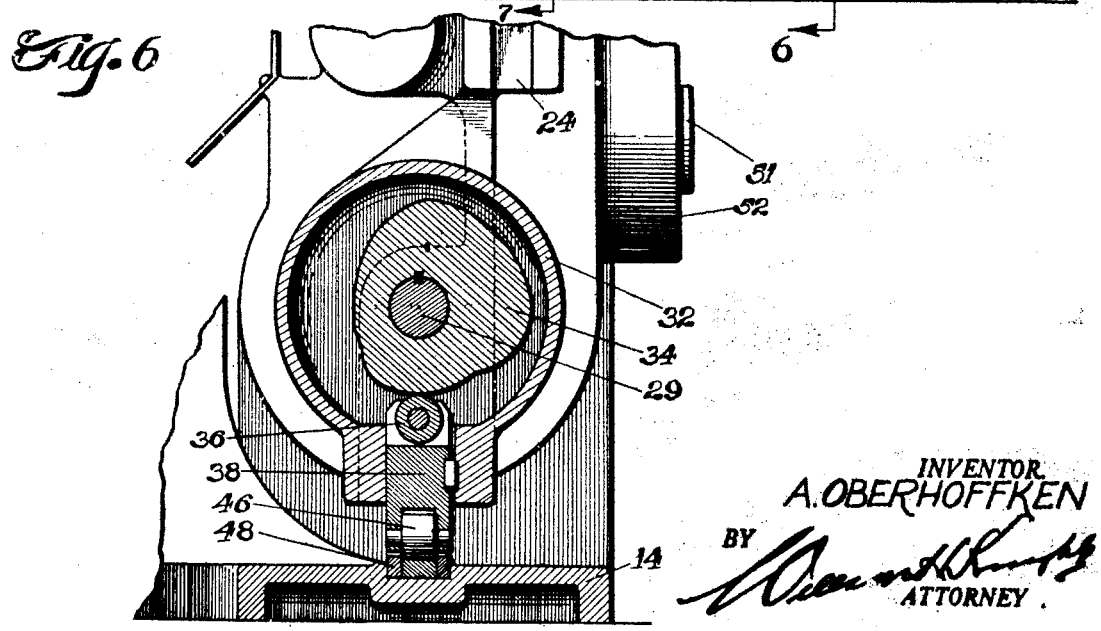
Fig. 6 is a detail view in plan, taken on the line 6—6, Fig. 5.

During the profiling cycle it is necessary to move the cutters in a path as indicated in Fig. 4, that is to say, they start in the center of the recesses then move to the left and follow the contour of the recesses with the cuts overlapping so as to completely finish not only the marginal edges of the recesses but the portions bounded by the marginal recesses. This path of movement of the cutters is accomplished by the cams 33 and 34 which impart vertical movement to the tool support and the end cams 39 and 40 which impart sidewise motion to the work support with the motions synchronized and overlapping. The motor 50 drives the worm 27 and since the worm is keyed on the shaft 29 this shaft will also rotate imparting the necessary rotation to the vertical cams and the end cams, the vertical cams having a configuration as indicated best in Fig. 6. Attention is called to the fact that these vertical lifting cams are fashioned with a plurality of constant radii which are active when the rollers 68 and 69 are occupying the variable radius of the camming grooves 66 and 67. In other words when the cutters are being fed into depth the motion of the tool supports is maintained constant and just as soon as the cutters have cut into depth then the motion of the tool support commences. This is also true when the cutters are retracted, that is to say, when the cutters are being retracted there is no motion imparted to the tool support. The end cams are also fashioned with flats as at 87 to give them a variable radius so that they not only impart the sidewise motion to the tool support during its vertical reciprocation with the result that the cuts made by the cutters are overlapped but when the constant radius of these cams are wiping across the rollers 43 and 44 there is no sidewise motion imparted to the tool support and at this time the tools are either being projected into depth or retracted.

Figure 8:
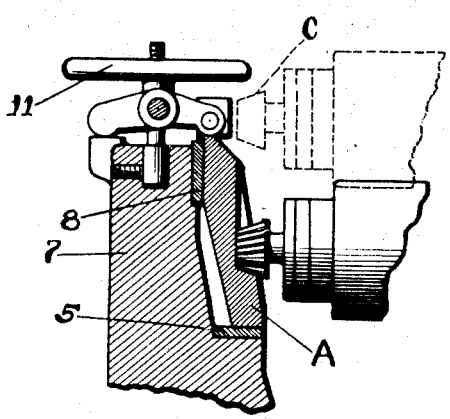
Fig. 8 is a view similar to Fig. 7 but showing the cam in a different stage of operation.

In some types of cylinder heads it is possible to start the tools in a valve opening in which event it will not be necessary to feed the tools into depth. In other cases it will be possible to feed the tool in from the side of the recess as indicated in Fig. 8 in this event it will not be necessary to feed them into depth as they can be started at the proper depth in the first place.

The cycle is automatically stopped after the cutters have been retracted by means of a stop switch 88. This switch is operated by a pin or other projection on the extended end of one of the rods. When the rod is pulled down the pin will snap the switch and cut out the motor.

The extension of the motor shaft is equipped with a brake 89 to bring the drive to a prompt stand still as soon as the current has been cut by the switch.

It will thus be seen that the camming devices impart a compound oscillating motion to the tool support while the work is held stationary. There would be no objection to moving the work toward the cutters to feed the cutters into depth but after this has been accomplished the work should then be held stationary during the actual profiling operation.

Having thus described and shown an embodiment of this invention, what I claim and desire to secure by Letters Patent of the United States is:

1. In a machine tool, the combination of a rotary tool, means for holding a work piece stationary when said tool is performing an operation thereon, means for effecting a relative feeding movement between the tool and work for determining the depth of the cut and means for causing the tool to describe an irregular orbit in a single plane and at an angle to its axis of rotation when the same is operating upon the work, comprising a vertically disposed support for the tool, horizontal track ways on which said support is guided for sidewise movement, vertical ways for guiding said support for vertical movement and camming means for imparting sidewise and vertical movement to the support on said track ways.

2. In a machine tool, the combination of a rotary tool, means for holding a work piece stationary when said tool is performing an operation thereon, means for effecting a relative feeding movement between the tool and work for determining the depth of the cut and means for causing the tool to describe an irregular orbit in a single plane and at an angle to its axis of rotation when the same is operating upon the work, comprising a vertically disposed support for the tool, guide ways for said support, a horizontal shaft journaled in said support, a plurality of cams mounted to rotate with said shaft, followers for some of said cams to cause the support to rise and fall and followers for other of said cams to impart sidewise movement to the support and means for driving said shaft.

3. In a machine tool, the combination of a rotary tool, means for holding a work piece stationary when said tool is performing an operation thereon, means for effecting a relative feeding movement between the tool and work for determining the depth of the cut and means for causing the tool to describe an irregular orbit in a single plane and at an angle to its axis of rotation when the same is operating upon the work, comprising a vertically disposed support for the tool, guide ways for said support, a horizontal shaft journaled in said support, a plurality of cams mounted to rotate with said shaft, followers for some of said cams to cause the support to rise and fall and followers for other of said cams to impart sidewise movement to the support and means for driving said shaft, comprising a worm wheel on said shaft, a worm gear meshing with said wheel, a motor and countershaft gearing connecting said worm gear in driving relation with said motor.

Signed at Rockford, in the county of Winnebago, and State of Illinois, this 3 day of Nov., 1930.

ALEXANDER OBERHOFFKEN.